US012679537B1

(12) United States Patent
Dev

(10) Patent No.: US 12,679,537 B1
(45) Date of Patent: Jul. 14, 2026

(54) SYSTEM OF AND METHOD FOR INTERACTING WITH A TARGET AND/OR AN ENVIRONMENT USING A DRONE SWARM

(71) Applicant: Florida A&M University, Tallahassee, FL (US)

(72) Inventor: Satyanarayan Dev, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 755 days.

(21) Appl. No.: 17/836,530

(22) Filed: Jun. 9, 2022

Related U.S. Application Data

(63) Continuation-in-part of application No. 16/737,590, filed on Jan. 8, 2020, now abandoned.

(60) Provisional application No. 62/789,628, filed on Jan. 8, 2019.

(51) Int. Cl.
B64C 39/02 (2023.01)

(52) U.S. Cl.
CPC ........ B64C 39/024 (2013.01); *B64U 2201/10* (2023.01)

(58) Field of Classification Search
CPC ...... A01M 99/00; A01M 29/16; A01M 29/14; A01M 29/22; A01M 29/24; A01M 29/28; B64C 39/024; B64C 2201/027; B64C 2201/126; B64C 2201/127; B64C 2201/143; B64C 2201/146; B64D 47/08; H01S 1/00

USPC ............................ 701/3, 6, 20, 2; 340/384.2
See application file for complete search history.

(56) References Cited

U.S. PATENT DOCUMENTS

| | | | |
|---|---|---|---|
| 3,997,785 A | 12/1976 | Callahan | |
| 5,528,049 A | 6/1996 | Callahan | |
| 6,250,255 B1 | 6/2001 | Lenhardt et al. | |
| 9,104,201 B1 * | 8/2015 | Pillai .................... | G08G 5/0082 |
| 10,866,597 B1 | 12/2020 | Reinhold et al. | |
| 2002/0125419 A1 * | 9/2002 | Callahan .................. | H01S 1/00 |
| 2010/0045457 A1 * | 2/2010 | Krill .................... | G08B 29/188 |
| 2017/0069214 A1 * | 3/2017 | Dupray ................ | G08G 5/0008 |
| 2017/0103659 A1 | 4/2017 | Jin | |

(Continued)

FOREIGN PATENT DOCUMENTS

KR 20200095416 A * 8/2020 ............. G05D 1/104

*Primary Examiner* — Ellis B. Ramirez
(74) *Attorney, Agent, or Firm* — Molly L. Sauter; Trenam Law

(57) ABSTRACT

Disclosed herein relates to a system of and method for solid-state microwave amplification by stimulated emission of radiation (hereinafter "MASER") and/or a sound amplification by stimulation emission of radiation (hereinafter "SASER") used in a series of micro-drones to for monitoring, protecting, controlling, disabling, sterilizing, and/or destroying of a target. The micro-drones may form an autonomous, self-sustaining swarm, such that the micro-drones may exit and rejoin the hybrid drone swarm, automatically, optimizing monitoring by allowing at least one micro-drone to be constantly within the hybrid drone swarm around the target without requiring downtime. Additionally, the micro-drones may automatically recharge via at least one solar panel. In addition, the present disclosure may defend a user and/or area from enemy drones or enemy targets using a system of micro-drones.

19 Claims, 11 Drawing Sheets

(56)                    References Cited

U.S. PATENT DOCUMENTS

| | | | | |
|---|---|---|---|---|
| 2017/0123418 | A1* | 5/2017 | Erickson | G08G 5/0082 |
| 2017/0300054 | A1* | 10/2017 | Hanson | B63B 1/32 |
| 2018/0077918 | A1 | 3/2018 | Yu | |
| 2019/0077519 | A1* | 3/2019 | Husain | B64F 1/222 |
| 2019/0107846 | A1 | 4/2019 | Roy et al. | |
| 2019/0112046 | A1* | 4/2019 | Lery | B61L 15/0081 |
| 2019/0285388 | A1 | 9/2019 | Klar | |
| 2020/0043348 | A1 | 2/2020 | Ghosh et al. | |
| 2020/0108922 | A1* | 4/2020 | Smith | G05D 1/12 |
| 2020/0201332 | A1 | 6/2020 | Pedersen et al. | |
| 2020/0252838 | A1* | 8/2020 | Akdeniz | H04W 36/0061 |

* cited by examiner

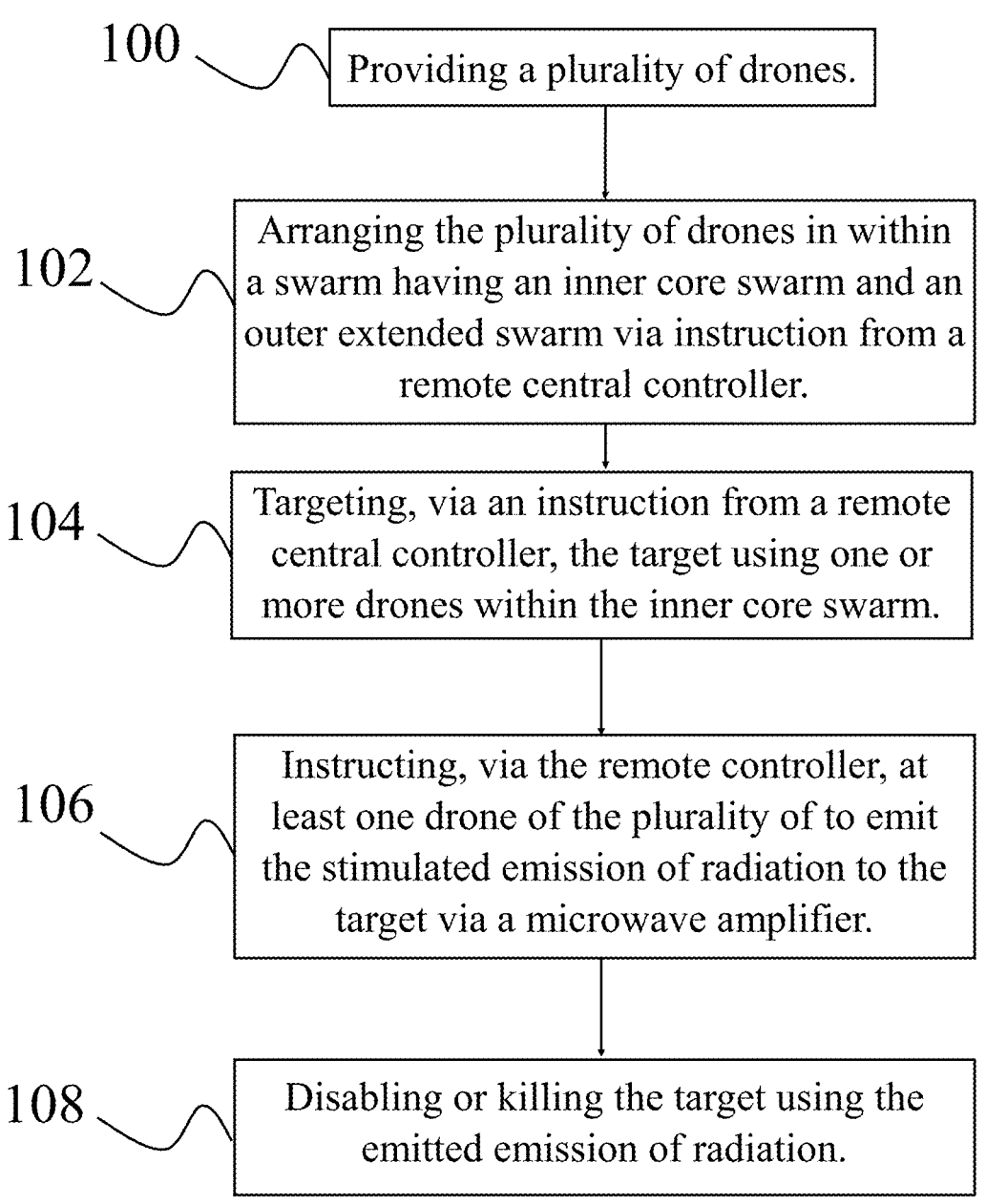

100 — Providing a plurality of drones.

102 — Arranging the plurality of drones in within a swarm having an inner core swarm and an outer extended swarm via instruction from a remote central controller.

104 — Targeting, via an instruction from a remote central controller, the target using one or more drones within the inner core swarm.

106 — Instructing, via the remote controller, at least one drone of the plurality of to emit the stimulated emission of radiation to the target via a microwave amplifier.

108 — Disabling or killing the target using the emitted emission of radiation.

*FIG. 2*

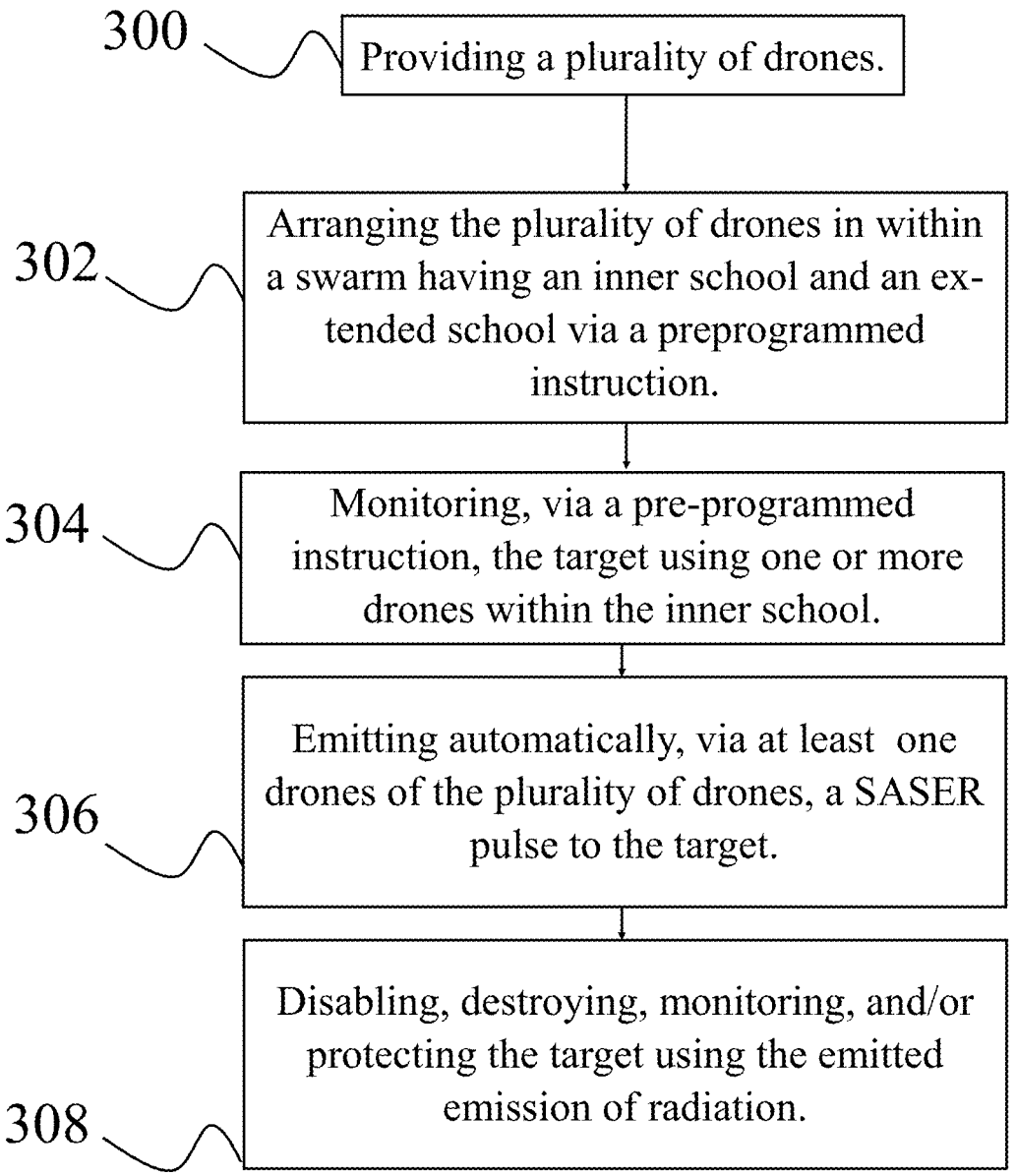

300 　Providing a plurality of drones.

302 　Arranging the plurality of drones in within a swarm having an inner school and an extended school via a preprogrammed instruction.

304 　Monitoring, via a pre-programmed instruction, the target using one or more drones within the inner school.

306 　Emitting automatically, via at least one drones of the plurality of drones, a SASER pulse to the target.

308 　Disabling, destroying, monitoring, and/or protecting the target using the emitted emission of radiation.

*FIG. 8*

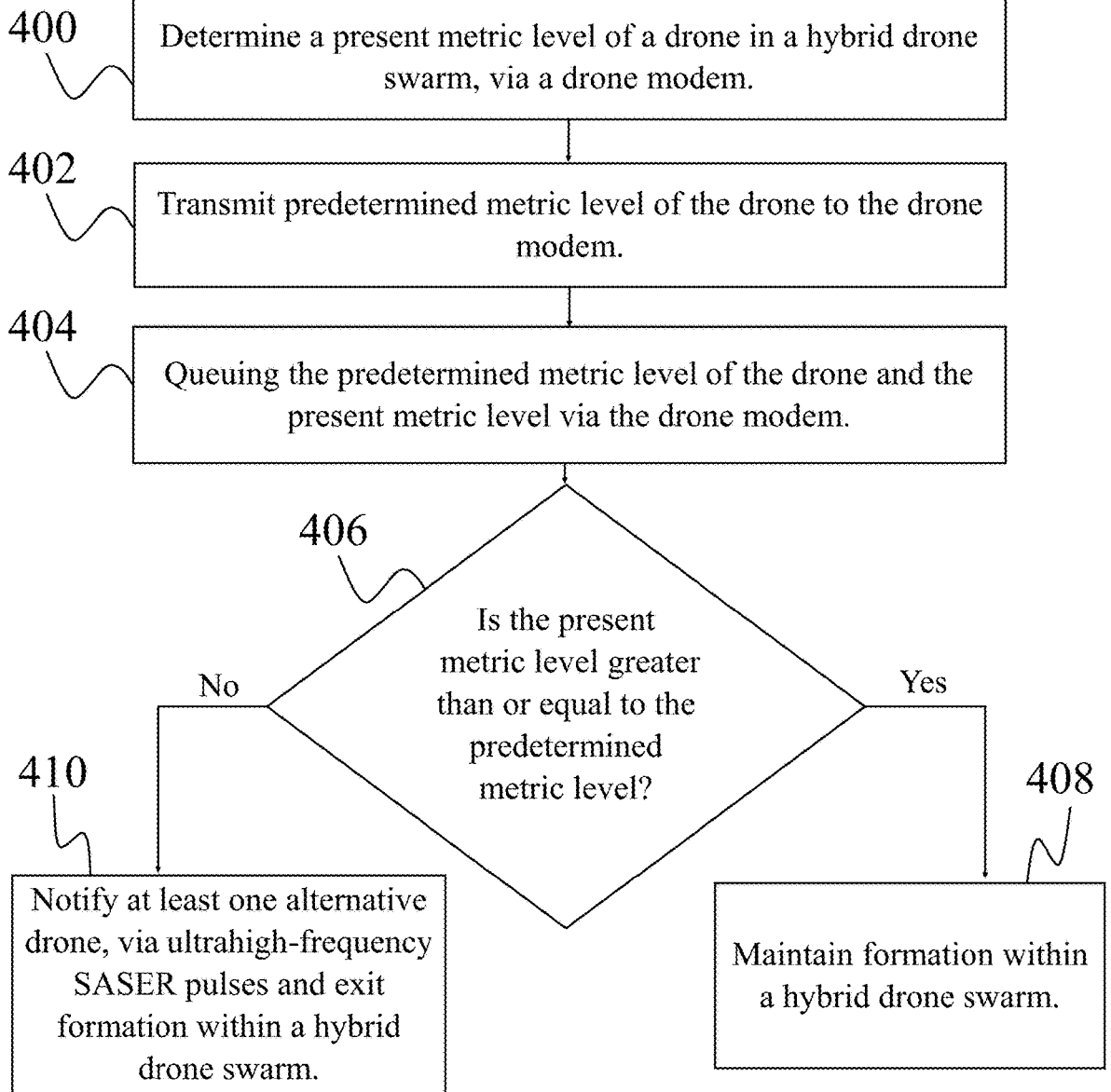

400     Determine a present metric level of a drone in a hybrid drone swarm, via a drone modem.

402     Transmit predetermined metric level of the drone to the drone modem.

404     Queuing the predetermined metric level of the drone and the present metric level via the drone modem.

406     Is the present metric level greater than or equal to the predetermined metric level?

No

Yes

410     Notify at least one alternative drone, via ultrahigh-frequency SASER pulses and exit formation within a hybrid drone swarm.

408     Maintain formation within a hybrid drone swarm.

*FIG. 9*

SYSTEM OF AND METHOD FOR INTERACTING WITH A TARGET AND/OR AN ENVIRONMENT USING A DRONE SWARM

CROSS-REFERENCE TO RELATED APPLICATIONS

This application is continuation-in-part of U.S. Nonprovisional patent application Ser. No. 16/737,590, entitled "DRONE SWARM USING MASER AND SASER FOR ENVIRONMENTAL MONITORING, PEST CONTROL, OR DEFENSE," filed Jan. 8, 2020, which claims priority to U.S. Provisional Application No. 62/789,628, entitled "DRONE SWARM USING MASER AND SASER FOR ENVIRONMENTAL MONITORING, PEST CONTROL, OR DEFENSE," filed Jan. 8, 2019 by the same inventor, all of which are incorporated herein by reference in their entireties for all purposes.

BACKGROUND OF INVENTION

1. Field of the Invention

This invention relates, generally, to systems and methods for target control and defense. More specifically, it relates to a system of and method for solid-state microwave amplification by stimulated emission of radiation (hereinafter "MASER") and/or a sound amplification by stimulation emission of radiation (hereinafter "SASER") used in a series of micro-drones to for internal (swarm networking) and the communication, monitoring, mapping, control, disabling, sterilizing and/or destruction of a target and/or an environment.

2. Brief Description of the Prior Art

Insects such as fleas, mosquitos, moths, etc. are undesirable as they may become bothersome, destroy property, and often pose health risks. Devices and methods for trapping, killing, and disposing of insects are well known in the art. These devices and methods have taken many forms and include, for example, flypaper, electric insect killers that kill by electrocution, and chemical pesticides. Conventional devices and methods have many shortcomings. For instance, flypaper and electric insect killers are both ineffective at attracting insects, and as such, are only marginally useful for eliminating insects within a given area. Chemical pesticides are dangerous to both the human population and the environment.

Chemical pesticides are also ineffective at attracting insects. It has long been known that insects are attracted to specific molecules of sex and host plant attractants. For certain insect species, specific attractants (such as "pheromones," which are insect produced volatile compounds) have been chemically identified and synthesized. The isolation of sex and host plant attractant molecules has progressed steadily over the past few decades. Attractants have been utilized in various conventional traps, but with poor results, since these traps dissipate all of their scents (e.g., pheromone) in the air and are rendered useless in little as a few days.

In U.S. Pat. No. 3,997,785 to Callahan, which is incorporated herein by this reference, described a system for vibrating a gold-coated needle in a molecular scent vapor contained in an enclosed chamber to stimulate and emit narrowband MASER-like energy from an infrared transmitting window for control of insects. This system, although providing advantages over other conventional solutions, was frequently ineffective because it failed to produce MASER-like frequencies that closely mimicked the frequencies produced by the insect being controlled.

In U.S. Pat. No. 5,528,049 to Callahan, which is incorporated herein by this reference, described a system for controlling insects by pumping radiation and molecular vibratory modulation to generate radiation frequencies that act either as an attractant or quenching radiation. However, this system was limited by the delivery methods and devices to cover a wide area adequately.

Accordingly, what is needed is a system of and method for which a target and/or an environment may be monitored, mapped controlled, protected, disabled, and/or destroyed, free of chemicals, harmless to humans, inexpensive, and easy to operate. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for a drone swarm utilizing MASER and SASER pulses for internal (swarm) networking, environmental monitoring, pest control, and/or defense is now met by a new, useful, and nonobvious invention.

An aspect of the present disclosure pertains to a method of automatically entering and exiting a formation of a hybrid drone swarm with a modem. In an embodiment, the method may comprise the following steps, including but not limited to: (a) loading, into a memory of the modem, a sensorial system; (b) transmitting, via a processor of the modem, a present metric value of the sensorial system; (c) receiving, via the processor of the modem, a predetermined metric level, such that the predetermined metric level may be configured to be a default metric level, via instruction from a remote central controller, associated with the drone; (d) comparing, via the processor, the present metric value with the predetermined metric level; and (e) automatically entering or existing the formation of a hybrid drone swarm with the modem by: (1) when a micro-drone is within the formation of the hybrid drone swarm, based on a determination that the present metric value is not greater than or at least equal to the predetermined metric level, notifying at least one alternative micro-drone via an amplified pulse wave and exiting the formation of the hybrid drone swarm; (2) when the micro-drone is within the formation of the hybrid drone swarm, based on a determination that the present metric value is greater than or at least equal to the predetermined metric level, maintaining status within the formation of the hybrid drone swarm; (3) when the micro-drone is outside the formation of the hybrid drone swarm, based on a determination that the present metric value is greater than or at least equal to the predetermined metric level, notifying at least one alternative micro-drone via the amplified pulse wave and entering the formation of the hybrid drone swarm; and (4) when the micro-drone is outside the formation of the hybrid drone swarm, based on a determination that the present metric value is not greater than or at least equal to the predetermined metric level, maintaining status outside the formation of the hybrid drone swarm.

In an embodiment, the amplified pulse wave may comprise acoustic wave, a microwave, and/or any electromagnetic wave and/or mechanical wave known in the art which may be used to communicate between a drone and at least one alternative drone. Additionally, in an embodiment, the amplified pulse wave may comprise an ultrahigh-frequency. Additionally, in this embodiment sensorial system may be configured to provide real-time battery level, data acquisition, target monitoring, and eco-system control.

In some embodiments, the formation of the hybrid drone swarm may comprise an inner school encompassed by an extended school. Moreover, in these other embodiments, the remote central controller may be located external to the swarm. Furthermore, in an embodiments, the method may further comprise the step of, after automatically exiting the formation of the hybrid drone swarm, charging a battery of the drone, via a solar panel, allowing the present metric value to become greater than or at least equal to the predetermined metric level. In this embodiment, the method may also further comprise step of, before automatically entering the formation of the hybrid drone warm, charging a battery of the drone, via a solar panel, allowing the present metric value to become greater than or at least equal to the predetermined metric level.

Another aspect of the present disclosure pertains to a micro-drone optimization system for automatically entering or exiting a formation of a hybrid drone swarm with a modem. In a embodiment, the micro-drone optimization system may comprise the following: (a) the modem having a processor; and (b) a non-transitory computer-readable medium operably coupled to the processor, the computer-readable medium having computer-readable instructions stored thereon that, when executed by the processor, cause the micro-drone optimization system to automatically enter or exist the formation of the hybrid drone swarm associated with the modem by executing instructions comprising: (1) loading, into a memory of the modem, a sensor; (2) transmitting, via a processor of the modem, a present metric value of the sensor; (3) receiving, via the processor of the modem, a predetermined metric level, such that the predetermined metric level may be configured to be a default metric level, via instruction from a remote central controller, associated with the drone; (4) comparing, via the processor, the present metric value with the predetermined metric level; and (5) automatically entering or existing the formation of a hybrid drone swarm with the modem by: (i) when a micro-drone is within the formation of the hybrid drone swarm, based on a determination that the present metric value is not greater than or at least equal to the predetermined metric level, notifying at least one alternative micro-drone via an amplified pulse wave and exiting the formation of the hybrid drone swarm; (ii) when the micro-drone is within the formation of the hybrid drone swarm, based on a determination that the present metric value is greater than or at least equal to the predetermined metric level, maintaining status within the formation of the hybrid drone swarm; (iii) when the micro-drone is outside the formation of the hybrid drone swarm, based on a determination that the present metric value is greater than or at least equal to the predetermined metric level, notifying at least one alternative micro-drone via the amplified pulse wave and entering the formation of the hybrid drone swarm; and (iv) when the micro-drone is outside the formation of the hybrid drone swarm, based on a determination that the present metric value is not greater than or at least equal to the predetermined metric level, maintaining status outside the formation of the hybrid drone swarm.

In an embodiment, the sensor may be configured to provide battery level, real-time data acquisition, monitoring, and eco-system control. In this embodiment, the formation of the hybrid drone swarm may comprise an inner school encompassed by an extended school. Additionally, the amplified pulse wave may comprise an ultrahigh-frequency.

In some embodiments, the executed instructions may further comprise the step of, after automatically exiting the formation of the hybrid drone swarm, charging a battery of the drone, via a solar panel, allowing the present metric value to become greater than or at least equal to the predetermined metric level. In this manner, in these other embodiments, the executed instructions may also further comprise the step of, before automatically entering the formation of the hybrid drone warm, charging a battery of the drone, via a solar panel, allowing the present metric value to become greater than or at least equal to the predetermined metric level.

Furthermore, another aspect of the present disclosure pertains to a method of interacting with a target using at least one micro-drone. In an embodiment, the method comprising the steps of: (a) providing the at least one micro-drone forming a hybrid drone swarm, each of the at least one micro-drones having an emitter configured to deliver a high-intensity amplified pulse wave to the target; (b) arranging the at least one micro-drone within the swarm forming a core swarm and an extended swarm, such that the core swarm may be configured to deliver the high-intensity amplified pulse wave to a target via a standard emission of radiation by the emitter and the extended swarm may be configured to permit entry and exit of one or more drones within the swarm; (c) identifying, via a processor of a modem of the drone, the target using at least one micro-drones within the core swarm; and (d) delivering the high-intensity amplified pulse wave to the target, via the standard emission of radiation by the emitter, such that the target is disabled, sterilized, and/or disabled.

In an embodiment, the emitter may comprise a MASER device, a SASER device, and/or any emitter known in the art which may produce coherent electromagnetic waves. Additionally in this embodiment, the micro-drone may further include a bio-sensor which may provide real-time data acquisition, monitoring, and eco-system control.

Moreover, in some embodiments, the method may further include the step of, after identifying the target using one or more micro-drones within the core school swarm, automatically correcting the amplified pulse wave via the emitter based on the corresponding real-time data provided by the bio-sensor, thereby optimizing the amplification of the pulse wave to the target by the micro-drone. As such, in these other embodiments, the drones may further include the use of frequencies to attract or repel the target, such that the frequencies may comprise ultrahigh-frequencies. Accordingly, repulsion may be achieved by emitting quenching frequencies timed to a communication system of the target or by emitting out of phase frequencies configured to interfere with the communication system of the target.

Another aspect of the present disclosure pertains to methods for targeting a pest, insect, or hostile drone (e.g., target) using one or more drones arranged in a swarm, thereby effectively disabling or killing the target. The method includes a plurality of drones arranged within a swarm having an inner core swarm and an outer extended swarm. Each drone within the swarm comprises at least a micro-wave amplifier configured to deliver a stimulated emission of radiation to the target. A remote central controller provides instructions to the drones and arranges the drones within swarm to either the inner core swarm or the outer extended swarm. In an embodiment, the remote central controller may be located external to the swarm. The inner core swarm is configured to deliver the stimulated emission of radiation to the target via the microwave amplifier and the outer extended swarm is configured to permit entry and exit of one or more of the drones within the swarm. Additionally, in an embodiment, a second swarm may be provided that communicates with the first swarm along communication paths. The second swarm may merge into or swap drones with the first swarm by interacting with the outer extended swarm.

At least one drone within the inner core swarm, when instructed by the remote central controller locates and targets the target (e.g., pest, insect, or hostile drone). Upon targeting, the drone(s) then emits the stimulated emission of radiation to the target via the microwave amplifier in pulses, thereby killing or disabling the target.

In an embodiment, one or more of the drones may include a solid-state amplifier, which is configured to emit a plurality of coherent acoustic waves in the ultra-high frequency range, thereby disabling the target. In an embodiment, the solid-state sound amplifier may include a bio-sensor to provide real-time data acquisition, monitoring, and control.

In a further embodiment, the drones may include a night vision camera that permits the drones to identify and target the target during low-light conditions. Further, in an embodiment, the drones include the use of frequency emitters to emit one or more frequencies that attracts or repels the target. The frequencies are selected from the group consisting of natural millimeter, infrared, visual ultraviolent, or ultraviolet x-ray frequencies.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

While the specification concludes with claims particularly pointing out and distinctly claiming what are regarded as embodiments of the invention, the advantages of embodiments of the disclosure may be more readily ascertained from the description of certain examples of embodiments of the disclosure when read in conjunction with the accompanying drawings, in which:

FIG. 2 is a flow-chart diagram of a method for the interaction of one or more drones with a target, according to an embodiment of the present disclosure.

FIG. 8 is a flow-chart diagram of a method for the interaction of a hybrid drone system and an underwater target, according to an embodiment of the present disclosure.

FIG. 9 depicts a process flow diagram depicting a method of automatically leaving a formation of a hybrid drone swarm via a modem, according to an embodiment of the present disclosure.

DETAILED DESCRIPTION OF THE INVENTION

Figure 1:
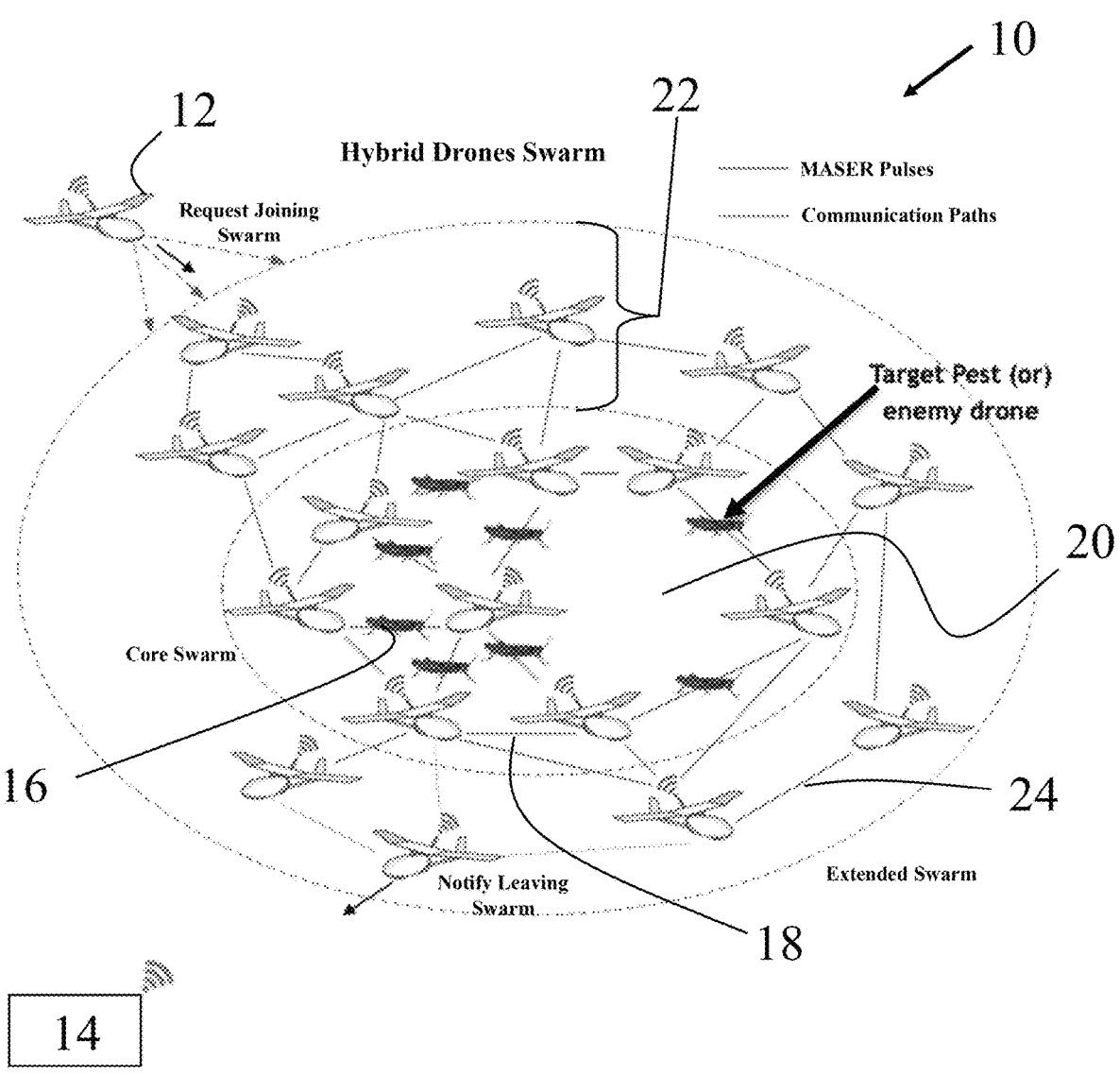
FIG. 1 is an exemplary configuration of a hybrid drone swarm delivering MASER pulses, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process.

The machine readable medium described below may be a machine readable signal medium or a machine readable storage medium. A machine readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device.

A machine readable signal medium may include a propagated data signal with machine readable program PIN embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program PIN embodied on a machine readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, or the like and conventional procedural programming languages, such as the "C" programming language or similar programming languages.

Aspects of the present invention are described below with reference to flowchart illustrations and/or block diagrams of methods, apparatus (e.g., systems) and computer program products according to embodiments of the invention. It will be understood that each block of the flowchart illustrations and/or block diagrams, and combinations of blocks in the flowchart illustrations and/or block diagrams, can be implemented by computing device program instructions. These computing device program instructions may be provided to a processor of a general purpose computer, special purpose computer, or other programmable data processing apparatus to produce a machine, such that the instructions, which execute via the processor of the computing device or other programmable data processing apparatus, create means for implementing the functions/acts specified in the flowchart and/or block diagram block or blocks.

These computing device program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The computing device program instructions may also be loaded onto a computer, other programmable data processing apparatus, or other devices to cause a series of operational steps to be performed on the computer, other programmable apparatus, or other devices to produce a computing device implemented process such that the instructions which execute on the computing device or other programmable apparatus provide processes for implementing the functions/acts specified in the flowchart and/or block diagram block or blocks.

As used herein, "computing device" includes, but is not limited to, electronic devices that are capable or wired or wireless data transmission and that are capable of graphically displaying data to a viewing user, such as a personal computer, laptop, mobile device, or similar device.

As used herein, the term "metric level" refers to any metric known in the art which may affect performance of a drone. Metric level may comprise battery level, engine integrity, electrical connection, and/or salinity levels. For ease of reference, the exemplary embodiment described herein refers to battery level, but this description should not be interpreted as exclusionary of other metric levels.

As used herein, the term "SASER device" refers to any emitter known in the art which may stimulate the emission of radiation. For ease of reference, the exemplary embodiment, described herein, refers to an emitter which stimulates the emission of radiation to produce acoustic radiation (e.g., sound wave), but this description should not be interpreted as exclusionary of other emitters.

As used herein, the term "MASER device" refers to any emitter known in the art which may stimulate the emission of radiation. For ease of reference, the exemplary embodiment, described herein, refers to an emitter which stimulates the emission of radiation to produce microwave radiation (e.g., a microwave), but this description should not be interpreted as exclusionary of other emitters.

As used herein, "about" means approximately or nearly and in the context of a numerical value or range set forth means ±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least,"

"greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

MASER Hybrid Drone Swarm:

The present disclosure pertains to a drone swarm utilizing MASER and SASER pulses for internal (e.g., swarm) networking and communication, environmental monitoring, pest control, or defense. FIG. 1 depicts a hybrid drone swarm 10 in accordance with an embodiment of the claimed subject matter. Micro-drones 12 (hereinafter drones 12) function as a collective and communicate with each other along wireless communication paths 24. To interact with each other, microcontrollers and dynamic c libraries form a wireless protocol that permits each drone 12 of the swarm 10 to communicate with one another wirelessly.

Each of the drones 12 are synchronized individual units acting together as a collective organism (e.g., swarm 10), sharing one remote central controller 14 for decision-making and adapting to each other like swarms 10 in nature. Remote central controller 14 may be a remote computer, second swarm, or individual drone 12 within swarm 10. In another embodiment, remote central controller 14 may be a computer program, algorithm, or routine common to all drones 12 with swarm 10. Drones 12 communicate and collaborate with each drone 12 within swarm 10 and the swarm has no leader. Hence, drone 12 can gracefully adapt to additional swarms of drones 12 entering or exiting swarm 10.

Drones 12 are operated autonomously; however, each individual done 12 within swarm 10 may be instructed, via remote central controller 14, to return home individually. In an embodiment, drones 12 are operated manually or scripted to perform a series of tasks, such as targeting and eliminating target 16. For example, if target 16 is detected within the physical mesh network (i.e., within inner core swarm 20 and/or outer extended swarm 22), drones 16 within inner core swarm 20 will automatically attack target 16 based on their scripted or programed tasks, thereby disabling, or destroying target 16. These scripted or programed tasks are carried out by drones 12 located within inner core swarm 20.

As is further depicted in FIG. 1, swarm 10 of drones 12 is maintained by drones 12 joining and leaving swarm 10. Swarm 10 is arranged in two strata-inner core swarm 20 and outer extended swarm 22. In some embodiments, inner core swarm 20 locks onto target 16 or enemy drone to emit MASER pulses 18. Inner core swarm 20 is a predetermined radius that is set based on the number of drones 12 within swarm 10 and the physical target area for accomplishing the task. The target area may be the patrol area, a predetermined geographical boundary, or a similar predetermined area. Outer extended swarm 22 permits drones 12 to join and leave swarm 10. There are communication paths 24 among all drones 12 within inner core swarm 20, within outer extended swarm 22, between inner core swarm 20 and outer extended swarm 22, and any additional swarms requesting to join swarm 10.

Outer extended swarm 22 permits entry and exit within swarm 10 and acts like a buffer zone where drones 12 reside for a period of time prior to entry into inner core swarm 20. During this time prior to entry into inner core swarm 20, drones 12 within outer extended swarm 22 establish communication paths 24 and prepare to perform the programmed task. In some embodiments, at least one drone 12 within swarm 10 may establish a communication path 24 with at least one alternative drone, via an ultrahigh-frequency MASER pulse 18. Additionally, in these other embodiments, the ultrahigh-frequency MASER pulse 18 may be used to establish at least one communication path 24 may have a frequency comprising a range of 300 MHz to 300 GHz, encompassing every integer in between. Furthermore, the MASER pulse 18 may be emitted by at least one MASER device disposed on drone 12. In this manner, in some embodiments, the at least one MASER device may be temporarily coupled to drone 12, such that if the at least one MASER device is no longer functional it may be readily replaced with at least one alternative MASER device. Moreover, in an embodiment, drone 12 may be configured to integrate at least one bio-sensor with a sensorial system of drone 12. As such, in this embodiment, the sensorial system of drone 12 may be configured to acquire and record data in real-time, monitor a biological ecosystem and/or an armament, a military structure (e.g., army base, naval base, air force base, military manufacturing plant), and/or monitor and record a battery level of drone 12. In addition, drone 202 may be configured to emit an amplified pulse wave to map the biological environment, the armament, and/or the military structure in three-dimensions ("3D").

Because of each drones 12 limited energy resources and capacity, drones 12 have limited propulsion (e.g., aerial, marine, and/or underwater) times to accomplish their programmed task. To maintain a constant number of drones 12 within inner core swarm 20, outer extended swarm 22 permits seamless entry and exit of drones 12, such that the total number of drones 12 performing the programmed task remains the same at any given point in time. By constantly having a set number of drones 12 within swarm 10, swarm 10 is able to achieve optimal performance during the entire duration of the task. In embodiments in which a second swarm is present, the second swarm may merge with the first swarm when the number of targets is greater than the capacity of the first swarm's capacity to destroy, disable, or kill targets 16. Further, the second swarm may merge with the first swarm, thereby strengthening the first swarm and allowing the merged swarm to handle a growing number of targets 16.

Once targets 16 are identified, drones 12 within inner core swarm 20 deliver microwave amplification by stimulated emission of radiation (MASER) pulses 18 to either target 16 (e.g., pest, insect, or hostile drone) or in an alternative embodiment, an enemy micro-drone in the context of warfare and defense. The MASER pulse 18 is capable of killing or sterilizing target 16 and may provide a defense against other drone swarms by generating high-intensity MASER 18 to work like a focused electromagnetic pulse (EMP) to deactivate the enemy drones.

By integrating solid-state MASER 18 (a device using the stimulated emission of radiation by exciting atoms to amplify and/or generate coherent monochromatic electromagnetic radiation in the microwave range) and generating short pulses (e.g., microwave pulse waves), target 16 can be destroyed and/or disabled instantaneously. In embodiments in which the target 16 is a pest or insect, laboratory studies have identified that MASER pulses, although not effective in killing all the larger targets 16 like the locust, sterilize the males and the sperm sac of the females resulting in no offspring. In some embodiments, night vision may be integrated into the swarm 10. Night vision allows drones 12 to quickly target and kill targets 16 like locusts, which cannot fly at night due to colder nighttime temperatures.

In some embodiments, the swarm 10 comprises the use of natural millimeter, infrared, visual ultraviolet (UV), ultrasonic, or UV-X-ray frequencies to control pests. Control may involve attracting target 16 (e.g., insect or pest) or repelling them. Many functions and frequencies are realized with the use of a specially designed frequency (wavelength) emitter, which uses the natural semi chemicals of a particular insect, and the dielectric scatter surface of the specific insect, to mimic the coded wavelength used by the organism in its day to day reproductive and food searching behavior. Attraction is achieved by emitting attraction frequencies of target 16 to be controlled. For example, when target 16 is a locust, attraction is achieved by replicating the locust's mating call (4.2 kHz, 3 syllables per chirp, syllable period=0.13 s & chirp pause=0.39 s). Repulsion is achieved by emitting quenching (or jamming) frequencies timed to the communication system of target 16, or by emitting out of phase frequencies that interfere with the molecular communication system of target 16.

In an embodiment, the claimed subject matter provides a method for emitting photonic waves that emulate natural waves that either attract or repel target 16 as desired. The photonic wave is, in turn, received by the dielectric waveguide(s) of target 16 (i.e., the insect's antenna). By varying the discharge energy, the scatter surface, and/or the attractant, the present invention may be "tuned" to achieve adequate performance with a wide range of target 16.

Accordingly, in an embodiment, at least one drone 12 of hybrid drone swarm 10 may account for the multiple variations within the amplified microwave pulse wave based aeronautic metrics including but not limited to alternating temperature, air condensation, and/or speed of wind within a surrounding area of target 16 by integrating an intelligent controller. The intelligent controller may be pre-programmed such that the intelligent controller may automatically correct the high-intensity MASER pulses 18 and/or ultrahigh-frequency MASER pulses 14 based on the aeronautic metrics surrounding at least one drone 12 of hybrid drone swarm 10.

Additionally, in an embodiment, the intelligent controller may comprise a modem, connected with several water sensors to optimize the high-intensity MASER pulses 18 and ultrahigh-frequency MASER pulses 14 through detecting the air conditions (e.g., temperature, air condensation, and/or wind speed) and correcting the amplified microwave pulse wave of the high-intensity MASER pulses 18 and ultrahigh-frequency SASER pulses 14, automatically. As such, by integrating a modem into drones 12 of hybrid drone swarm 10, a compact, inexpensive, high-powered, and general-purpose underwater communications system may be built with the different digital modulation schemes In some embodiments the digital modulation schemes may comprise FH, M-ary PSK, and/or any digital modulation scheme known in the art.

Figure 11:
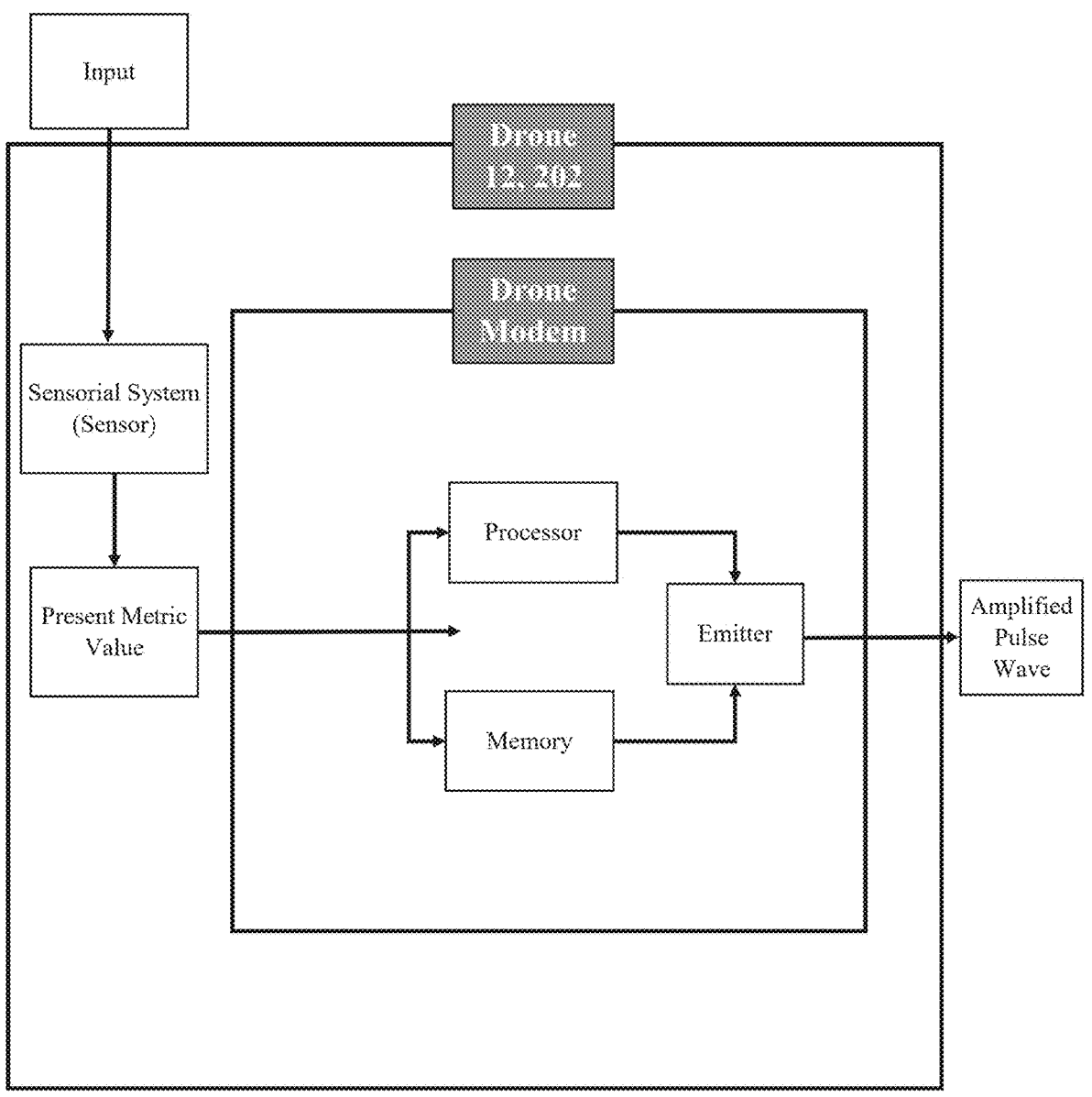
FIG. 11 is a block system diagram depicting a drone of a hybrid drone swarm where a modem having a processor, memory, sensorial system, and/or emitter reside and where an amplified pulse wave is emitted, via the processor and/or the emitter, based on the input received by the sensorial system (e.g., a sensor), according to an embodiment of the present disclosure.

Method of Use:

Referring now to FIG. 2, in conjunction with FIG. 1 and FIG. 11, an exemplary process flow diagram is provided, depicting a method of targeting pest 16 using swarm 10 of drones 12. The steps delineated in the exemplary process flow diagram of FIG. 2 are merely exemplary of a preferred order for the interacting of one or more drones 12 with a target 16. The steps may be carried out in another order, with or without additional steps included therein. Additionally, the steps may be carried out with an alternative embodiment of the drone swarm 10, as contemplated in the description above.

The method for the targeting of one or more targets 16 begins at step 100, during which a plurality of drones 12 is provided. The plurality of drones 12 includes the components discussed above. The method then proceeds to step 102 in which the plurality of drones 12 is arranged within swarm 10 having inner core swarm 20 and outer extended swarm 22 via instruction from remote central controller 14. The method then proceeds to step 104 in which drones 12 within inner core swarm 20, via an instruction from the remote central controller 14, lock onto target 16. Next, the plurality of drones 12 within inner core swarm 20 emits a stimulated emission of radiation to target 16 via a microwave amplifier to disable or kill target 16 using the emitted emission of radiation.

SASER Hybrid Drone School:

Underwater Sensor Networks, known in the art, face numerous constraints, such as limited bandwidth, high propagation delay, 3D topology, and power constraints. Radio and optical waves are not feasible for communication, including but not limited to marine and/or underwater, at each ocean point. Under these limitations, underwater sensorial systems and/or sensor networks can only utilize acoustic signals. As such, another feature of the present disclosure is that the micro-drones may be configured to emit solid-state sound amplification by stimulated emissions of radiation, (hereinafter "SASER") acoustic signals to both communicate underwater and target biological entities.

Figure 3:
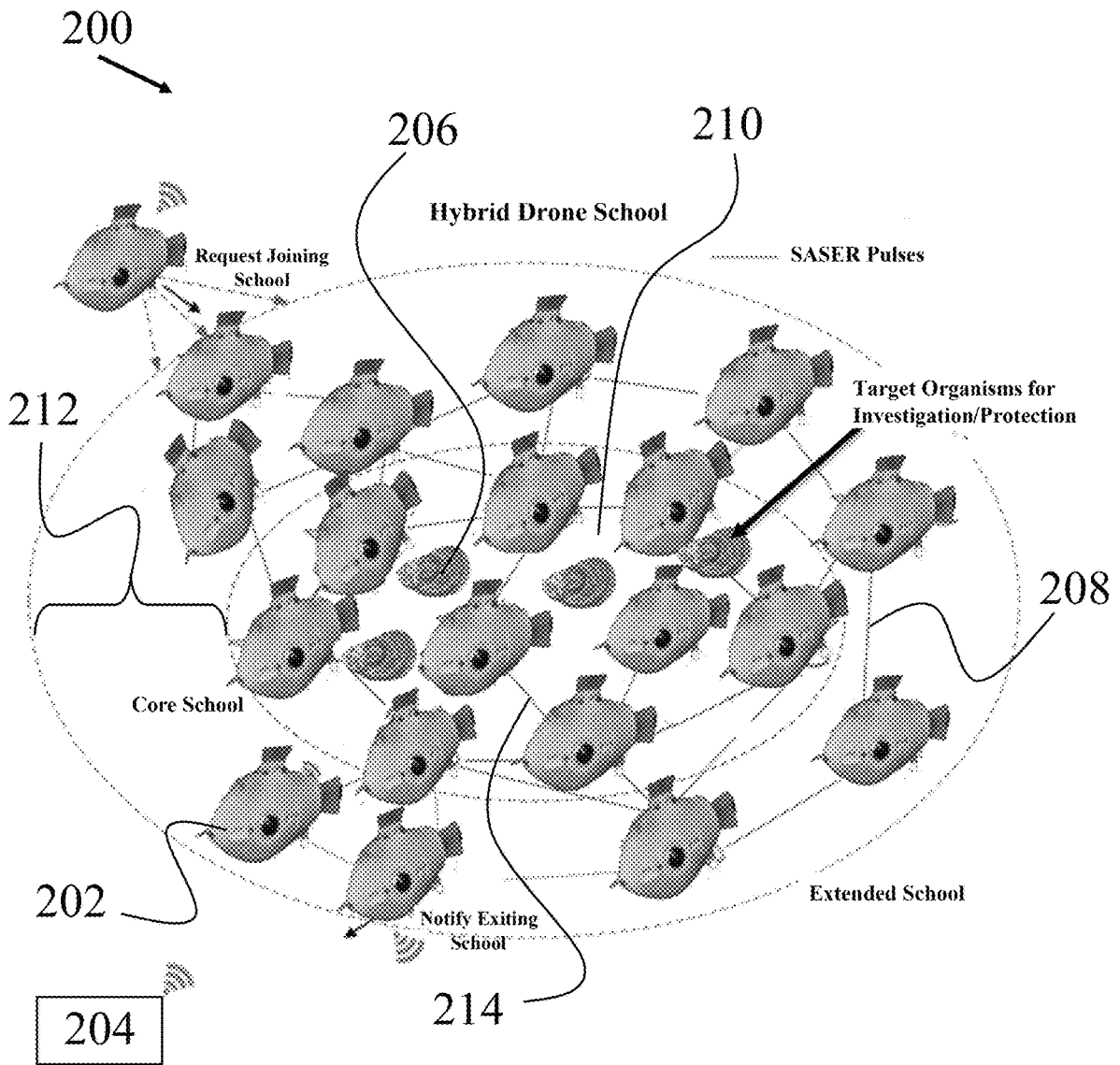
FIG. 3 is an exemplary configuration of a hybrid drone swarm monitoring an underwater target, according to an embodiment of the present disclosure.

As shown in FIG. 3, in an embodiment, a hybrid done swarm 200 ("hybrid drone swarm 200" may also be referred to as "hybrid drone school 200" for underwater application) may be used for underwater internal (swarm) networking and communication environmental monitoring. In this manner, hybrid down school 200 may be used to collect marine data, underwater position, off-shore exploration, disaster prevention, tactical monitoring of a naval structure (e.g., naval submarine and aircraft positions), and/or any marine and/or underwater monitoring known in the art. Accordingly, as shown in FIG. 3, in this embodiment, the hybrid drone school 200, may create a SASER pulse, such that at least one micro-drone 202 (hereinafter "drone 202") may function autonomously within the network of hybrid drone swarm 200. In some embodiments, drone 202 may comprise at least one SASER device, such that drone 202 may stimulate an emission of an acoustic wave to amplify and/or generate coherent acoustic waves in an ultrahigh-frequency range (e.g., sound pulse wave and/or acoustic pulse wave). In this manner, in these other embodiments, drone 202 may emit a coherent acoustic pulse wave having a frequency comprising a range of 300 kHz to 3 GHz, encompassing every integer in between. In some embodiments, the SASER device may be configured to amplify and/or generate coherent monochromatic mechanical radiation in the acoustic range.

Moreover, as shown in FIG. 3, in an embodiment, drone 202 may also emit a high-intensity acoustic signal. As such, done 202 destroy and/or disable a biological entity in real-time by applying SASER pulses 208 comprising high-intensity in a target fashion. For example, the high-intensity acoustic signal emitted by drone 202 may comprise at least 130 dB to destroy target 206, such as algal cell walls to remediate situations including but not limited to severe algal blooms. In some embodiments, done 202 may be configured to emit an acoustic signal that may comprise both the high-intensity and the ultrahigh-frequency range. In some embodiments, drone 202 may be configured to emit an acoustic signal which causes delayed destruction and/or disabling of a target 206, such that hybrid drone school 200 may depart from the area and avoid correlation between hybrid drone school 200 and the destruction and/or disabling of the biological entity. Furthermore, in an embodiment, drone 202 may be configured to integrate at least one bio-sensor with a sensorial system of drone 202. As such, in this embodiment, the sensorial system of drone 202 may be configured to acquire and record data in real-time, monitor a biological ecosystem and/or a naval structure, and/or monitor and record a battery level of drone 202. In addition, drone 202 may be configured to emit an amplified pulse wave to map a biological environment and/or a naval structure in three-dimensions ("3D"). Additionally, in some embodiments, the sensorial system of drone 202 may be comprise a water quality sensor and/or a LiDAR sensor. In this manner, drone 202 may be configured to detect the dissolved oxygen, pH, temperature, salinity, nutrients (e.g., nitrogen and phosphorus), and/or any water metrics known in the art. Additionally, as shown in FIG. 3, in these other embodiments, drone 202 may comprise a solar panel, such that as drone 202 detects low battery, it may rise to the surface and collect photoelectric aspects to recharge drone 202 and return to hybrid drone school 200. Accordingly, drone school 200 may be configured to work autonomously, allowing drones 202 to continuously monitor target 206 and recharge, as needed.

In this manner, FIG. 3 depicts an exemplary configuration of hybrid drone school 200 monitoring an underwater biological environment. Drones 202 may function as a collective and communicate with each other along wireless communication paths 204. For example, drones 202 may use SASER acoustic pulses 214 comprising ultrahigh-frequencies to communicate with one another to determine location of each drone and the monitoring area. As such, in order to interact with each other, microcontrollers and dynamic c libraries may form a protocol which may permit each drone 202 of hybrid drone school 200 to communicate with one another acoustically.

Figure 4:
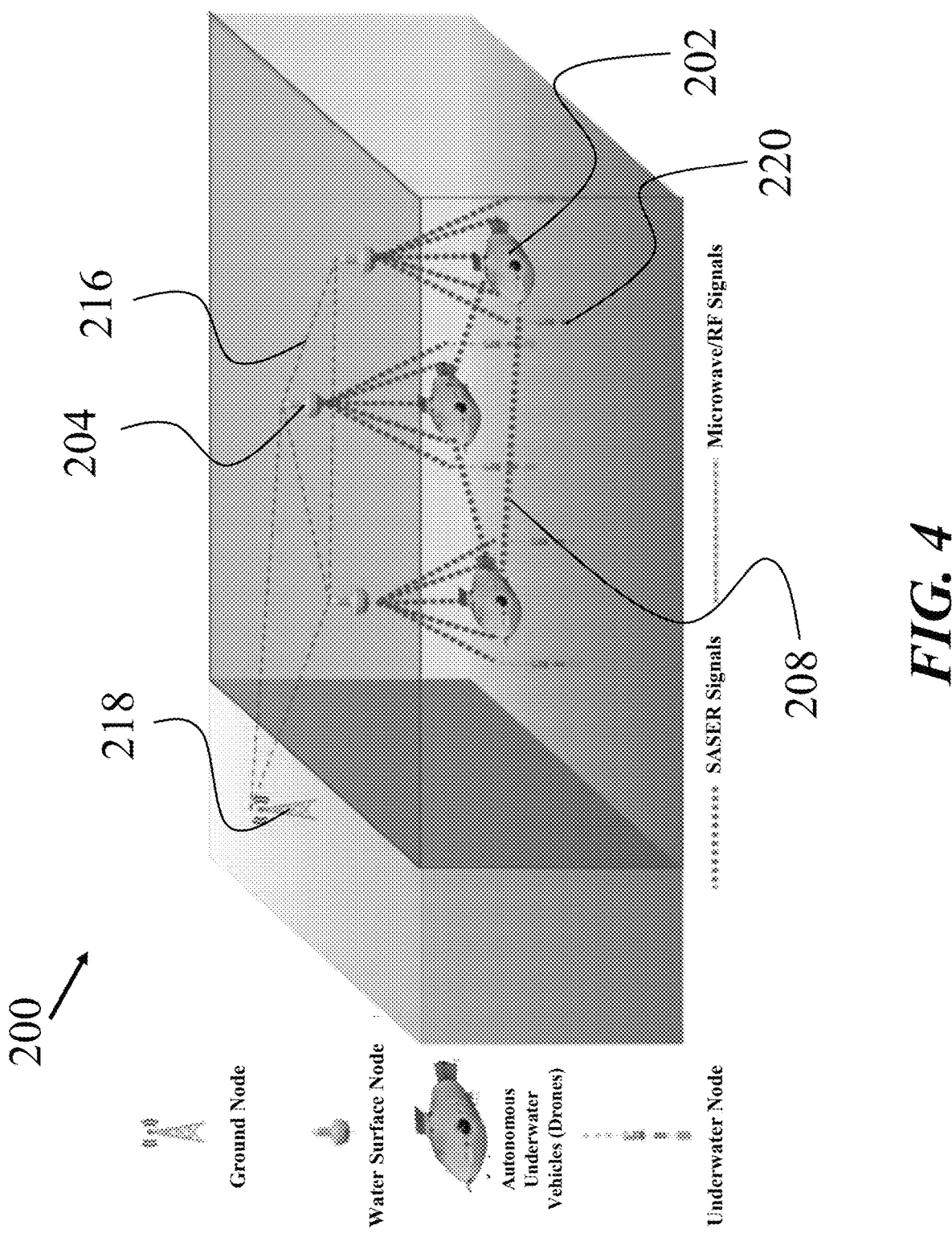
FIG. 4 is an alternative exemplary configuration of a hybrid drone swarm monitoring an underwater target, according to an embodiment of the present disclosure.

As shown in FIG. 3, in conjunction with FIG. 4, each of the drones 202 may be synchronized individual units acting together as a collective organism (e.g., hybrid drone school 200). Accordingly, in an embodiment, each drone 202 may share one remote central controller 204 for decision-making and adapting to each other in order to maintain the formation of hybrid drone school 200. As such, remote central controller 204 may comprise a water surface node, in wireless communication with a ground node 218, to allow a user to control to hybrid drone school 200, in real-time. Additionally, as shown in FIG. 4, in this embodiment, the user may be able to pre-program hybrid drone school 200, via ground node 218 and remote central controller 204, via microwave/RF signals 216, allowing hybrid drone school 200 to function autonomously, optimizing the monitoring and detection of the biological environment and/or the naval structure. In some embodiments, ground node 218 may communicate via microwave/RF signals with remote central controller 204, allowing remote central controller 204 to communicate with hybrid drone school 200 and underwater node 220, via SASER pulses comprising ultrahigh-frequencies, to identify target 206 and the area surrounding target 206. As such, drone 202 may communicate and collaborate with at least one alternative drone within hybrid drone school 200. Hence, drone 202 may be able to gracefully adapt to additional drones and/or at least one alternative hybrid drone schools entering or exiting the first hybrid drone school 200.

In some embodiments, ground node 218 may comprise a computing device, a radio tower, and/or any wireless communication device known in the art.

Furthermore, as shown in FIG. 3, drones 202 may be operated autonomously. In this manner, drone 202 may comprise a solar panel to allow for recharging, removing the need to return to an origin point for maintenance, optimizing hybrid drone school 200 monitoring of a biological environment or naval structure. In some embodiments, each individual done 202 within school 200 may be instructed, via remote central controller 204, to return home individually. Additionally, in these other embodiments, drones 202 may be operated manually or scripted to perform a series of tasks, such as targeting and/or destroying and/or disabling a target 206. For example, if target 206 is detected within the hybrid drone school network (e.g., within core school 210 and/or extended school 212), drones 202 within inner core school 210 may automatically engage target 206 with a SASER pulse 208, comprising a high-intensity acoustic signal, based on a scripted and/or programed tasks, thereby disabling and/or destroying target 206. In addition, in some embodiments, hybrid drone school 200 may be programed to automatically monitor and/or protect a biological entity 206 from a potential threat, such that drones 202 may be configured to emit a SASER pulse 208 to surrounding entities (e.g., predatory species, enemy naval structures). As such, hybrid drone school 200 may continuously monitor and/or protect target 206 until hybrid drone school 200 receives a new task from remote central controller 204.

As further depicted in FIGS. 3-4, hybrid drone school 200 of drones 202 may be maintained by at least one drone 202 joining and/or leaving hybrid drone school 200. As such, in an embodiment, hybrid drone school 200 may be arranged in two strata-core school 210 and extended school 212. In this embodiment, core school 210 locks onto target 206 and emit SASER pulses 208 comprising high-intensity. Additionally, core school 210 may monitor and protect target 206, such that core school 210 of drones 202 may emit high-intensity SASER pulses 208 to surrounding entities. In this manner, core school 210 may comprise a predetermined radius, which may be predetermined based on the following characteristics, including but not limited to, (1) number of drones 202 within hybrid drone school 200; and (2) the physical target area for accomplishing the task. The target area may comprise a biological area, a naval patrol area, a predetermined geographical boundary, and/or a similar predetermined area known in the art. In an embodiment, extended school 212 may permit drones 202 to request joining and/or leaving hybrid drone school 200. In this embodiment, at least one drone 202 communicates with at least one other drone 202 within the hybrid drone school, via SASER pulses 214 comprising ultrahigh-frequency acoustic signals. As such, core school 210 and extended school 210 may comprise ultrahigh-frequency SASER pulses 214 (e.g., drone 202 communication paths 214) among all drones 202 within core school 210, within extended school 212, between core school 210 and extended school 212, any additional drones 202 or at least one alternative hybrid drone schools requesting to join and/or leave the first hybrid drone school 200, and/or any additional drone communication paths known in the art.

Moreover, as depicted in FIG. 3, extended school 212 may permit entry and/or exit within hybrid drone school 200. As such extended school 212 may act as a buffer zone where drones 202 may reside for a period of time prior to entry into core school 210 of hybrid drone school 200. Accordingly, during the time prior to entry into core school 210, drones 202 within extended school 212 may establish ultrahigh-frequency SASER pulses 214 to communicate between drone 202 and at least one alternative drone 202 within hybrid done school 200 and may prepare to perform the programmed task. Because of each drones 200 limited energy resources and capacity, drones 202 have limited propulsion times to accomplish their programmed task. In some embodiments, drones 202 may comprise solar panels, such that at least one drone 202 may leave hybrid drone school 200 in order to approach the water surface to effectively recharge the energy resources and capacity and request rejoining hybrid drone school 200 when the at least one drone 202 energy resources are full.

In order to maintain a constant number of drones 202 within core school 210, extended school 212 may permit the seamless entry and exit of drones 202, such that the total number of drones 202 performing the programmed task may remain the same at any given point in time. As shown in FIGS. 3-4, by constantly having a set number of drones 202 within hybrid drone school 200, hybrid drone school 200 may optimize performance, such as monitoring and/or protecting target 206, mapping the topography and water metrics surrounding target 206, and/or destroying or disabling target 206. In some embodiments, the at least one alternative hybrid drone school may merge with the first hybrid drone school 200 when the number of targets 206 is greater than the capacity of the first hybrid drone school 200. In this manner, the first hybrid drone school may monitor target 206, while the at least one alternative hybrid drone school may protect target 206 from surrounding entities, emitting high-intensity SASER pulses 208 to disable and/or destroy the surrounding entities. Additionally, the at least one alternative hybrid drone school may be configured to monitor the area surrounding target 206, while the first hybrid drone school 200 may be configured to destroy and/or disable target 206, in real time, or in a delayed manner. Further, the at least one alternative hybrid drone school may merge with the first hybrid drone school 200, thereby strengthening the first hybrid drone school 200 and allowing the merged school to handle an increasing number of targets 206 and area surrounding the targets 206.

Furthermore, once targets 206 are identified, drones 202 within core school 210 may deliver SASER pulses 208 to either target 206 (e.g., pest, invasive species, insect, naval structure, and/or a hostile drone) or in an alternative embodiment, a surrounding entity in order to protect target 206 and the area surrounding target 206 in the context of warfare and defense. The SASER pulse 208 may be capable of destroying and/or disabling target 206, and in an alternative embodiment, may provide protection against surrounding entities as the drones protect and monitor target 206. In these other embodiments, target 206 may comprise an endangered biological species, friendly naval structures, and/or any biological entity, naval structure, or topographic area known in the art, which a drone may be used to monitor and/or protect. Additionally, hybrid drone school 200 may be used against other drone schools by generating high-intensity SASER pulses 208 to work like a focused electromagnetic pulse (EMP) to deactivate the enemy drones or other surrounding entities.

By integrating SASER pulses 208 and generating short-term pulses, hybrid drone school 200 may optimize target 206 destruction, disabling, and/or protection, by initializing SASER pulses 208 and causing the destruction, disabling, and/or protection of target 206 instantaneously. In some embodiments, when target 16 may be a pest or invasive species, laboratory studies have identified that SASER pulses 208, while potentially not entirely effective in killing all larger targets 206 like the sea urchins or sea starts, may sterilize the males and the sperm sac of the females resulting in no offspring. Additionally, in some embodiments, night vision may be integrated into the hybrid drone school 200. Night vision may allow drones 200 to quickly target and kill targets 206 like sea snails, sea urchins, or sea stars, which are more active on the sea floor during the night.

Figure 5:
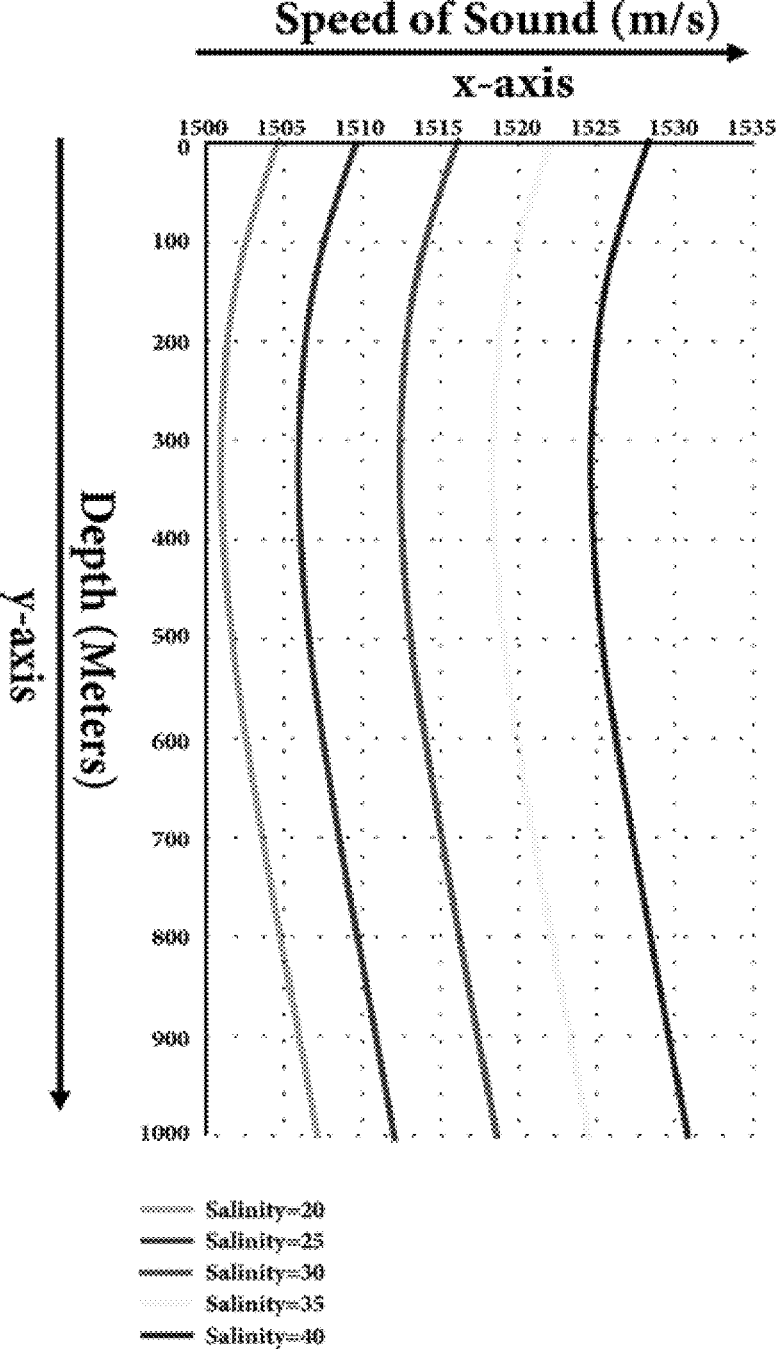
FIG. 5 graphically depicts a speed of a sound in a solution having variable salinity, according to an embodiment of the present disclosure.
Figure 6:
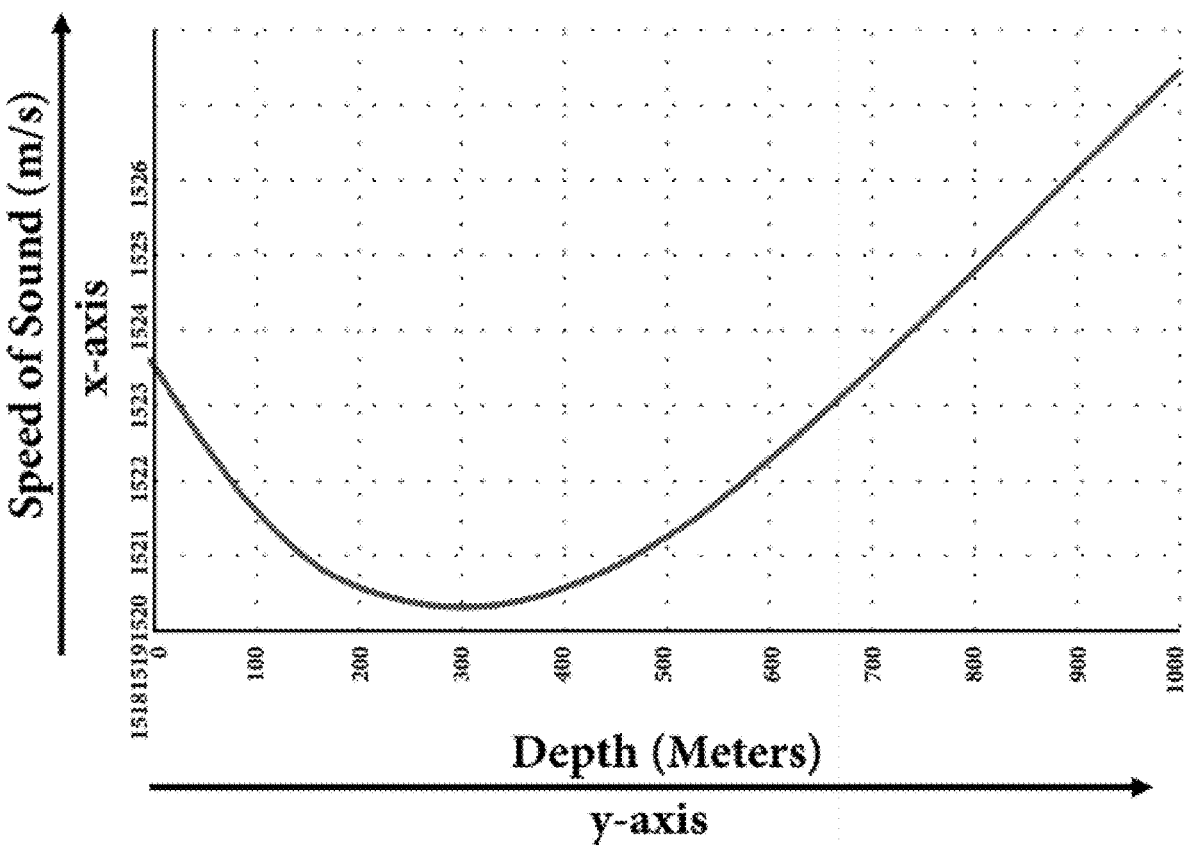
FIG. 6 graphically depicts a speed of a sound in a solution having a uniform salinity, according to an embodiment of the present disclosure.
Figure 7:
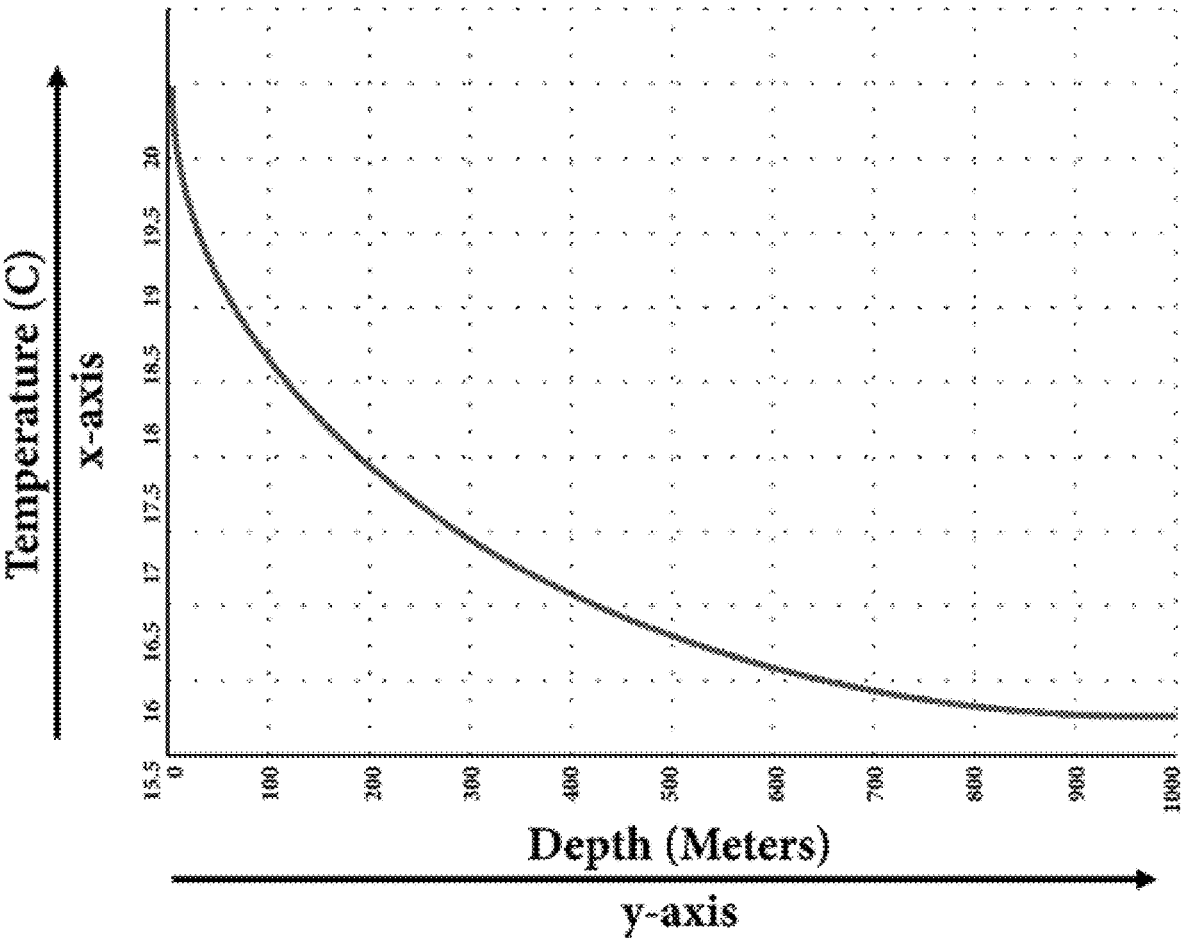
FIG. 7 graphically depicts a temperature of a solution, according to an embodiment of the present disclosure.

As shown in FIGS. 5-7, the speed of sound and temperature is not constant in the ocean. Near the ocean's surface, as shown in FIGS. 5-6, the speed of sound may be 1500 m/s that is four times, compared to the speed of sound in air. The upper part of the ocean is called the surface layer, in which temperature change is less significant. In contrast, as shown in FIG. 7, in the layer beneath (e.g., thermocline), the temperature may be a prominent factor that affects the sound's speed compared to others. FIG. 3 depicts the variation of the speed of sound with respect to temperature, depth, and salinity of the ocean.

As shown in FIG. 7, the temperature of sea surface is much higher compared to the bottom temperature, and the temperature falls with depth and then becomes constant. As shown in FIG. 5, the velocity of sound is also affected by the increase in depth, salinity, and temperature, because these are the major factors that affect the speed of sound in the underwater environment. The effect of these environmental parameters can be observed in three domains. In the first domain, the impact of temperature is dominating compared to the other parameters, but in the second domain, both depth and temperature are dominating factors in sound speed. In the third domain, the sound speed is purely dominated by the depth. Speed of sound is also depending upon salinity. Speed of the sound increases with the seawater's increasing salinity, but the curve's shape does not change.

As shown in FIGS. 6-7, the speed of sound increases due to an increase in the temperature of the ocean and decreases in colder oceans. Approximately the amount of 1° C. may boost the speed of sound near to 4.0 m/s. The boost of 1 practical salinity unit may enhance the speed of sound by nearly 1.4 m/s. As a result, each 1 km depth may boost the sound speed of nearly 17 m/s. In this manner, multiple amplified acoustic pulse waves may be used to get different environment parameters and, as such, is no standardization of parameters for the monitoring of underwater environment, which results in a variety of monitoring systems, however there is no standard monitoring practice known in the art.

Accordingly, in an embodiment, at least one drone 202 of hybrid drone school 200 may account for the multiple variations within the amplified acoustic pulse waves based nautical metrics including but not limited to temperature variance, salinity, and/or speed of sound within water by integrating an intelligent controller. The intelligent controller may be pre-programmed such that the intelligent controller may automatically correct the high-intensity SASER pulses 208 and/or ultrahigh-frequency SASER pulses 214 based on the water metrics surrounding at least one drone 202 of hybrid drone school 200.

Additionally, in an embodiment, the intelligent controller may comprise a modem, connected with several water sensors to optimize the high-intensity SASER pulses 208 and ultrahigh-frequency SASER pulses 214 through detecting the water conditions (e.g., salinity, temperature variance, and/or depth of water) and correcting the amplified acoustic pulse wave of the high-intensity SASER pulses 208 and ultrahigh-frequency SASER pulses 214, automatically. As such, by integrating a modem into drones 202 of hybrid drone system 200, a compact, inexpensive, high-powered, and general-purpose underwater communications system may be built with the different digital modulation schemes In some embodiments the digital modulation schemes may comprise FH, M-ary PSK, and/or any digital modulation scheme known in the art. Moreover, in an embodiment, the modem may accommodate a relative speed of at least 5 kts (2.5 m/sec). In addition, in these other embodiments, the modem of the drone 202 may also be configured to detect a battery level of the drone 202 in order to determine when a drone requires charging.

In some embodiments, the relative speed of at least 5 kts may occur at the standard ultrasonic carrier frequency of 26 kHz and may provide tracking through all at least one header and at least one cargo packet. Furthermore, in an embodiment, the modem of at least one drone 202 of hybrid drone school 200 may also utilize common signal processing tools, such as tight correlation and convolution, FFTs, and data storage optimizing the high-intensity SASER pulses 208 and ultrahigh-frequency SASER pulses 214 correction by automatically alternating the amplified acoustic pulse wave emitted by the at least one drone 202 based on the water metrics gathered by sensors on the at least one drone 202 using algorithms. In some embodiments, the algorithms may be written in an application of a computing device which may comprise Python and/or MATLAB programming systems.

Method of Use:

Referring now to FIG. 8, in conjunction with FIGS. 3-7, an exemplary process flow diagram is provided, depicting a method for the interaction of hybrid drone system 200 and underwater target 206, according to an embodiment of the present disclosure. The steps delineated in the exemplary process flow diagram of FIG. 8 are merely exemplary of a preferred order for the interacting of one or more drones 202 with a target 206. The steps may be carried out in another order, with or without additional steps included therein. Additionally, the steps may be carried out with an alternative embodiment of the hybrid drone school 200, as contemplated in the description above.

As shown in FIG. 8, the method for the interacting with at least one target 206 begins at step 300, during which a plurality of drones 202 is provided. The plurality of drones 202 may include the components discussed above. The method then proceeds to step 302 in which the plurality of drones 202 may be arranged within hybrid drone school 200, such that the formation of the hybrid drone school 200 has a core school 210 and an extended school 212, via a preprogrammed instruction. In some embodiments, the formation may be instructed via a remote central controller 204 (e.g., water surface node 204) and a ground node 218. The method then proceeds to step 304 in which drones 202 within core school 210 of the hybrid drone school 200, may automatically lock onto and/or monitor the at least one target 206. Next, at step 306, the plurality of drones 202 within core school 210 of the hybrid drone school 200 may emit a SASER pulse 208 (e.g., a high-intensity amplified acoustic pulse wave) to target 206 via a SASER device disposed about the drone. Finally, at step 308, at least one drone 202 in the core school 210 of the hybrid drone school 200 may disable, destroy, and/or sterilize target 206 using the SASER pulse 208. In some embodiments the SASER device may be disposed within drone 202. In other embodiments, the SASER device may be temporarily coupled to drone 202.

Exiting Formation:

FIG. 9, in conjunction with FIGS. 3-7, depicts a process flow diagram depicting a method of automatically leaving and rejoining hybrid drone swarm 200, according to an embodiment of the present disclosure. The steps delineated in FIG. 9 are merely exemplary of an order of leaving and rejoining hybrid drone swarm 200. The steps may be carried out in another order, with or without additional steps included therein.

As shown in FIG. 9, in conjunction with FIGS. 3-7 and FIG. 11, the method begins at step 400, in which a present metric value of drone 202 may be determined, via the modem of drone 202. In an embodiment, this step may include a processor of the modem receiving an electrical signal from a sensor, such as a sensor of drone 202. Additionally, as shown in FIG. 11, the present metric value of drone 202 may then be stored within the memory of the modem, such that the modem may access the memory prior to the metric of drone 202 reaching a compromising level, damaging drone 202.

Next at step 402, the processor of the modem of drone 202 may transmit a predetermined metric level of drone 202 to modem of drone 202. Further at step 404, the modem of drone 202 may also queue the present metric value. Following the modem of drone 202 queuing the present metric value of drone 202, at step 406, the modem then may compare the present metric value to the predetermined metric level of drone 202 for that specific metric level. Finally, the method then proceeds to either step 408 or step 410 depending on whether the present metric value of drone 202 is greater than or at least equal to the predetermined metric level of drone 202.

During step 408, the modem of drone 202 determines that the present metric value of drone 202 is greater than or at least equal to the predetermined metric level of drone 202. As such, during step 408, the modem of drone 202 may execute instructions to maintain drone 202 in the same formation of hybrid drone swarm 200. Therefore, drone 202 does not leave hybrid drone swarm 200.

During step 410, the modem of drone 202 determines that the present metric value is not greater than or at least equal to the predetermined metric level of drone 202. As such, during step 410, the modem may execute instructions to activate an ultrahigh-frequency SASER pule 214 to notify at least one alternative drone within hybrid drone swarm 200 that drone 202 will be leaving the formation of hybrid drone swarm 200. Finally, the modem may activate the propulsion system of drone 202 and drone 202 exits the formation within hybrid drone swarm 200.

Figure 10:
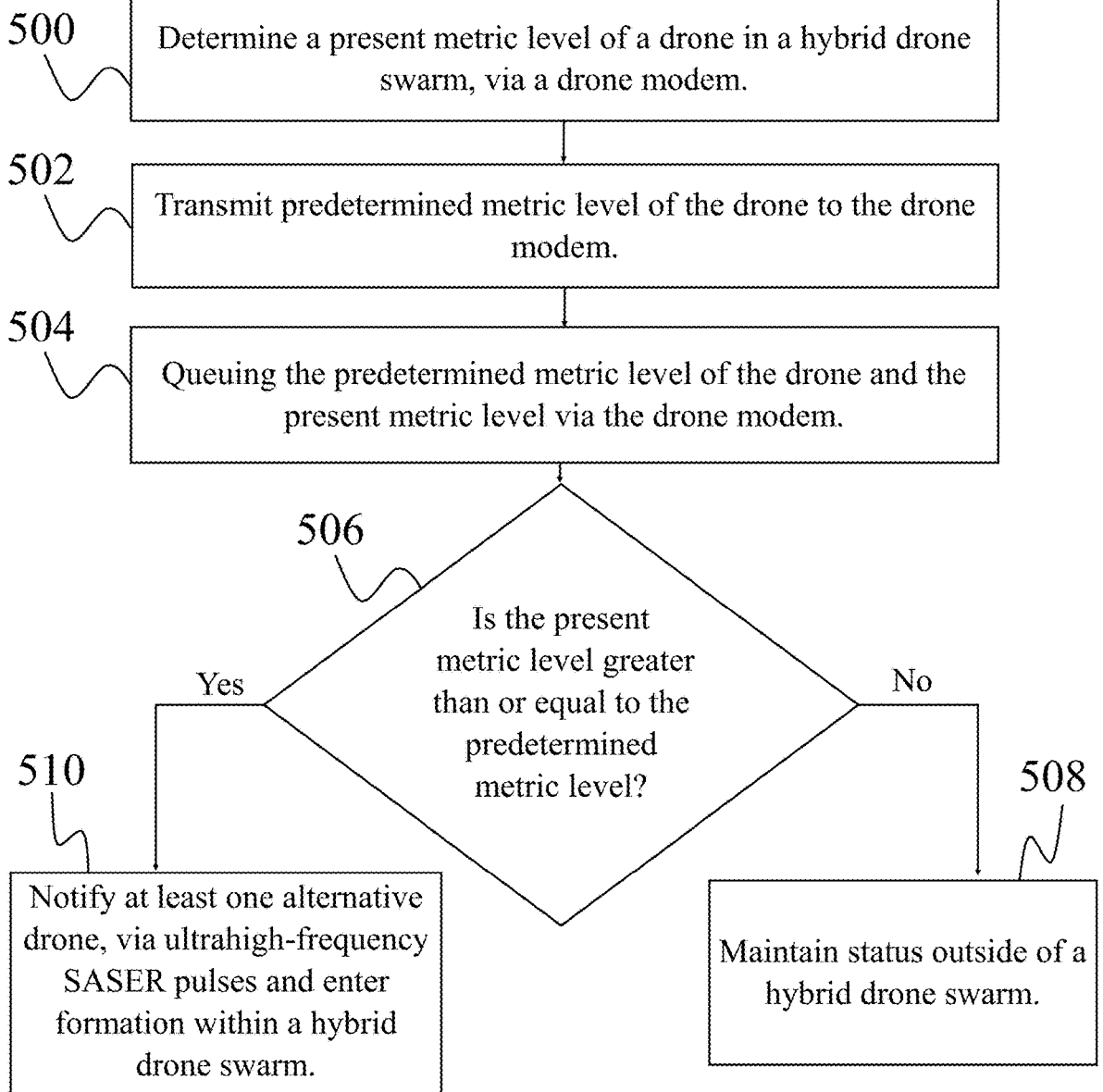
FIG. 10 depicts a process flow diagram depicting a method of automatically entering a formation of a hybrid drone swarm via a modem, according to an embodiment of the present disclosure.

Entering Formation:

FIG. 10, in conjunction with FIGS. 3-7, depicts a process flow diagram depicting a method of automatically leaving and rejoining hybrid drone swarm 200, according to an embodiment of the present disclosure. The steps delineated in FIG. 10 are merely exemplary of an order of leaving and rejoining hybrid drone swarm 200. The steps may be carried out in another order, with or without additional steps included therein.

As shown in FIG. 10, in conjunction with FIGS. 3-7 and FIG. 11, the method begins at step 500, in which a present metric value of drone 202 may be determined, via the modem of drone 202. In an embodiment, this step may include a processor of the modem receiving an electrical signal from a sensor, such as a sensor of drone 202. In this manner, as shown in FIG. 11, the present metric value of drone 202 may then be stored within the memory of the modem, such that the modem may access the memory prior to the metric of drone 202 reaching a compromising level, damaging drone 202.

Next at step 502, the processor of the modem of drone 202 may transmit a predetermined metric level of drone 202 to modem of drone 202. Further at step 504, the modem of drone 202 may also queue the present metric value. Following the modem of drone 202 queuing the present metric value of drone 202, at step 506, the modem then may compare the present metric value to the predetermined metric level of drone 202 for that specific metric level. Finally, the method then proceeds to either step 508 or step 510 depending on whether the present metric value of drone 202 is greater than or at least equal to the predetermined metric level of drone 202.

During step 508, the modem of drone 202 determines that the present metric value of drone 202 is not greater than or at least equal to the predetermined metric level of drone 202. As such, during step 508, the modem of drone 202 may execute instructions to maintain drone 202 outside the formation of hybrid drone swarm 200. Therefore, drone 202 does not enter hybrid drone swarm 200.

During step 510, the modem of drone 202 determines that the present metric value is greater than or at least equal to the predetermined metric level of drone 202. As such, during step 510, the modem may execute instructions to activate an ultrahigh-frequency SASER pule 214 to notify at least one alternative drone within hybrid drone swarm 200 that drone 202 will be entering the formation of hybrid drone swarm 200. Finally, the modem activates the propulsion system of drone 202 and drone 202 enter the formation within hybrid drone swarm 200.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of automatically entering and exiting a formation of a hybrid drone swarm within an atmospheric environment, a marine environment, or both, the method comprising the steps of:

loading, into a memory of a modem, a sensorial system;

transmitting, via a processor of the modem, a present metric value of the sensorial system;

receiving, via the processor of the modem, a predetermined metric level;

comparing, via the processor, the present metric value with the predetermined metric level; and automatically entering or exiting the formation of a hybrid drone swarm by at least one micro-drone of at least one alternative hybrid drone swarm by:

when a micro-drone of the at least one alternative hybrid drone swarm is within the formation of the hybrid drone swarm, if the present metric value is not greater than or at least equal to the predetermined metric level, notifying at least one micro-drone of the hybrid drone swarm via an amplified pulse wave from an emitter of the micro-drone, exiting the formation of the hybrid drone swarm, or both;

when the micro-drone of the at least one alternative hybrid drone swarm is within the formation of the hybrid drone swarm, if the present metric value is greater than or at least equal to the predetermined metric level, maintaining status within the formation of the hybrid drone swarm;

when the micro-drone of the at least one alternative hybrid drone swarm is outside the formation of the hybrid drone swarm, if the present metric value is greater than or at least equal to the predetermined metric level, notifying at least one micro-drone of the hybrid drone swarm via the amplified pulse wave, entering the formation of the hybrid drone swarm, or both; and when the micro-drone of the at least one alternative hybrid drone swarm is outside the formation of the hybrid drone swarm, if the present metric value is not greater than or at least equal to the predetermined metric level, maintaining status outside the formation of the hybrid drone swarm;

providing, by the sensorial system, real-time environmental metrics;

correcting the amplified pulse wave based on the real-time environmental metrics provided by the sensorial system, thereby optimizing the entering and exiting of the micro-drone from the formation of the hybrid drone swarm; and wherein each micro-drone autonomously executes entry or exit decisions from the formation without centralized coordination from a controller.

2. The method of claim 1, wherein the amplified pulse wave is selected from a group consisting of acoustic waves, microwaves, and a combination of thereof.

3. The method of claim 2, wherein the amplified pulse wave comprises an ultrahigh-frequency.

4. The method of claim 1, wherein the sensorial system is configured to provide real-time battery level, data acquisition, target monitoring, and eco-system control.

5. The method of claim 1, wherein the formation of the hybrid drone swarm comprises an inner swarm encompassed by an extended swarm.

6. The method of claim 1, wherein the controller is selected from a group consisting of an intelligent controller, a remoter central controller, and a combination of thereof.

7. The method of claim 4, further comprising the step of, after automatically exiting the formation of the hybrid drone swarm, charging a battery of the micro-drone of the at least one alternative hybrid drone swarm, via a solar panel, allowing the present metric value to become greater than or at least equal to the predetermined metric level.

8. The method of claim 4, further comprising the step of, before automatically entering the formation of the hybrid drone warm, charging a battery of the micro-drone of the at least one alternative hybrid drone swarm, via a solar panel, allowing the present metric value to become greater than or at least equal to the predetermined metric level.

9. A micro-drone optimization system for automatically entering or exiting a formation of a hybrid drone swarm with a modem within an atmospheric environment, a marine environment, or both, the micro-drone optimization system comprising:

the modem having a processor; and a non-transitory computer-readable medium operably coupled to the processor, the computer-readable medium having computer-readable instructions stored thereon that, when executed by the processor, cause the micro-drone optimization system to automatically enter or exist the formation of the hybrid drone swarm associated with the modem by executing instructions comprising:

loading, into a memory of a modem, a sensorial system;

transmitting, via a processor of the modem, a present metric value of the sensorial system;

receiving, via the processor of the modem, a predetermined metric level;

comparing, via the processor, the present metric value with the predetermined metric level; and automatically entering or exiting the formation of a hybrid drone swarm by at least one micro-drone of at least one alternative hybrid drone swarm by:

when a micro-drone of the at least one alternative hybrid drone swarm is within the formation of the hybrid drone swarm, if the present metric value is not greater than or at least equal to the predetermined metric level, notifying at least one micro-drone of the hybrid drone swarm via an amplified pulse wave from an emitter of the micro-drone, exiting the formation of the hybrid drone swarm, or both;

when the micro-drone of the at least one alternative hybrid drone swarm is within the formation of the hybrid drone swarm, if the present metric value is greater than or at least equal to the predetermined metric level, maintaining status within the formation of the hybrid drone swarm;

when the micro-drone of the at least one alternative hybrid drone swarm is outside the formation of the hybrid drone swarm, if the present metric value is greater than or at least equal to the predetermined metric level, notifying at least one micro-drone of the hybrid drone swarm via the amplified pulse wave, entering the formation of the hybrid drone swarm, or both;

when the micro-drone of the at least one alternative hybrid drone swarm is outside the formation of the hybrid drone swarm, if the present metric value is not greater than or at least equal to the predetermined metric level, maintaining status outside the formation of the hybrid drone swarm;

providing, by the sensorial system, real-time environmental metrics;

correcting the amplified pulse wave based on the real-time environmental metrics provided by the sensorial system, thereby optimizing the entering and exiting of the micro-drone from the formation of the hybrid drone swarm; and wherein each micro-drone autonomously executes entry or exit decisions from the formation without centralized coordination from a controller.

10. The micro-drone optimization system of claim 9, wherein the sensorial system is configured to provide real-time battery level, data acquisition, monitoring, and eco-system control.

11. The micro-drone optimization system of claim 9, wherein the formation of the hybrid drone swarm comprises an inner swarm encompassed by an extended swarm.

12. The micro-drone optimization system of claim 9, wherein the amplified pulse wave comprises an ultrahigh-frequency.

13. The micro-drone optimization system of claim 10, wherein the executed instructions further comprise the step of, after automatically exiting the formation of the hybrid drone swarm, charging a battery of the drone, via a solar panel, allowing the present metric value to become greater than or at least equal to the predetermined metric level.

14. The micro-drone optimization system of claim 10, wherein the executed instructions further comprise the step of, before automatically entering the formation of the hybrid drone warm, charging a battery of the drone, via a solar panel, allowing the present metric value to become greater than or at least equal to the predetermined metric level.

15. A method of interacting with a target in an atmospheric environment, a marine environment, or both using at least one micro-drone, the method comprising the steps of:

providing the at least one micro-drone forming a hybrid drone swarm, each of the at least one micro-drones having an emitter configured to deliver a high-intensity amplified pulse wave to the target;

arranging the at least one micro-drone within the swarm forming an inner swarm and an outer swarm based on a predetermined metric level, wherein the inner swarm is configured to deliver the high-intensity amplified pulse wave to a target via a standard emission of radiation by the emitter and the outer swarm is configured to permit entry and exit of one or more drones within the swarm;

identifying, via a processor of a modem of the drone, the target using the at least one micro-drones within the core swarm;

delivering the high-intensity amplified pulse wave to the target, via the standard emission of radiation by the emitter;

loading, into a memory of the modem, a sensorial system;

providing, by the sensorial system, real-time environmental metrics;

correcting the amplified pulse wave based on the real-time environmental metrics provided by the sensorial system, thereby optimizing the amplification of the pulse wave to the target by the micro-drone; and wherein each micro-drone autonomously executes entry or exit decision from the outer swarm without centralized coordination from a controller.

16. The method of claim 15, wherein the emitter is selected from a group consisting of a MASER device, a SASER device, and a combination of thereof.

17. The method of claim 15, wherein the sensorial system provides real-time battery level, data acquisition, monitoring, and eco-system control.

18. The method of claim 15, wherein the drones further include the use of frequencies to attract or repel the target, wherein the frequencies are selected from the group consisting of ultrahigh-frequencies.

19. The method of claim 18, wherein repulsion is achieved by emitting quenching frequencies timed to a communication system of the target or by emitting out of phase frequencies configured to interfere with the communication system of the target.

* * * * *